United States Patent
Parthipan

(10) Patent No.: US 9,398,429 B2
(45) Date of Patent: *Jul. 19, 2016

(54) COMMUNICATION DEVICE THAT PERMITS A USER TO SELECT ANY OF MULTIPLE USER-SELECTABLE COMMUNICATION TYPES FOR A REPLY

(71) Applicant: HEWLETT-PACKARD DEVELOPMENT COMPANY, L.P., Houston, TX (US)

(72) Inventor: Paramsothy Parthipan, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,763

(22) Filed: Apr. 2, 2015

(65) Prior Publication Data
US 2015/0215751 A1 Jul. 30, 2015

Related U.S. Application Data

(63) Continuation of application No. 11/739,531, filed on Apr. 24, 2007, now Pat. No. 9,002,338.

(51) Int. Cl.
*H04W 4/00* (2009.01)
*H04W 4/14* (2009.01)
*H04M 1/725* (2006.01)
*H04L 12/58* (2006.01)
*H04L 29/06* (2006.01)
*H04M 3/02* (2006.01)
*H04M 1/2745* (2006.01)
*H04M 1/57* (2006.01)
*H04M 1/64* (2006.01)

(52) U.S. Cl.
CPC .............. *H04W 4/14* (2013.01); *H04L 51/046* (2013.01); *H04L 51/38* (2013.01); *H04L 65/4023* (2013.01); *H04M 1/72552* (2013.01); *H04M 3/02* (2013.01); *H04M 1/274508* (2013.01); *H04M 1/575* (2013.01); *H04M 1/64* (2013.01)

(58) Field of Classification Search
CPC ..................... H04M 1/72547; H04M 2250/60; H04M 1/72519; H04M 1/7253; H04M 3/5307; H04M 3/533; H04M 3/5335; H04M 1/7255; H04M 1/72552; H04M 1/72555; H04M 2201/42; H04M 2207/20; H04M 2250/12; H04M 2250/22
USPC ........ 455/418, 416, 414.1, 550.1, 174.1, 212; 370/482; 379/376.01, 376.02, 374.03, 379/421
See application file for complete search history.

(56) References Cited

U.S. PATENT DOCUMENTS

| | | | | |
|---|---|---|---|---|
| 6,823,184 B1 * | 11/2004 | Nelson | .................. | H04M 1/642 455/412.2 |
| 7,305,068 B2 * | 12/2007 | Tucker | ................ | H04M 1/6505 379/52 |
| 9,002,338 B2 * | 4/2015 | Parthipan | .......... | H04M 1/72552 370/482 |
| 2005/0232166 A1 * | 10/2005 | Nierhaus | ............. | H04L 12/1813 370/260 |
| 2006/0046695 A1 * | 3/2006 | Copeland | ............ | H04M 3/5322 455/412.1 |
| 2007/0116194 A1 * | 5/2007 | Agapi | ................. | H04L 12/5835 379/67.1 |
| 2008/0165283 A1 * | 7/2008 | Brandt | .............. | H04M 3/42195 348/552 |

\* cited by examiner

*Primary Examiner* — Nimesh Patel
(74) *Attorney, Agent, or Firm* — Dhand Law PC

(57) ABSTRACT

A communication device comprises logic and an input device coupled to the logic. The input device is adapted to permit a user to select a communication type. The logic receives a communication in a first communication type and permits a user to reply to the communication using any of a plurality of user-selectable communication types.

18 Claims, 2 Drawing Sheets

COMMUNICATION DEVICE THAT PERMITS A USER TO SELECT ANY OF MULTIPLE USER-SELECTABLE COMMUNICATION TYPES FOR A REPLY

This patent application is a continuation application of U.S. patent application Ser. No. 11/739,531, filed Apr. 24, 2007, titled "A COMMUNICATION DEVICE THAT PERMITS A USER TO SELECT ANY OF MULTIPLE USER-SELECTABLE COMMUNICATION TYPES FOR A REPLY," the relevant contents of which herein being incorporated by reference.

BACKGROUND

Phones and various types of messaging devices allow users to respond to a message only in the same form as the original message. For example, upon receiving an electronic mail (email) message, the user can respond only with another email message.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
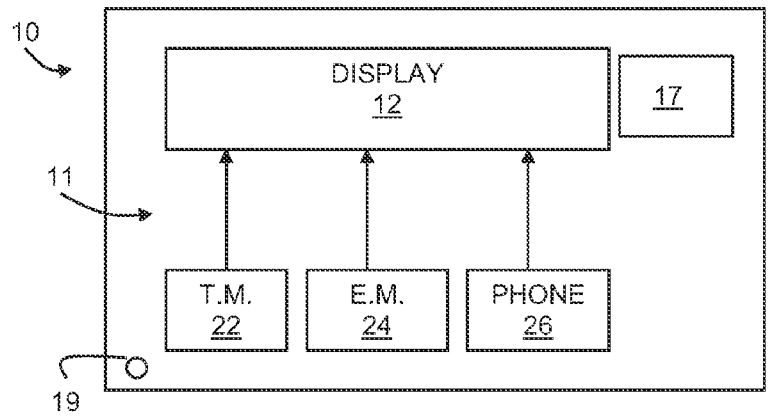
FIG. 1 shows a communication device in accordance with various embodiments.

FIG. 1 shows an illustrative embodiment of a communication device 10. The communication device 10 comprises a display 12 and one or more input controls (e.g., buttons) 22, 24, and 26. In the example of FIG. 1, input control 22 is associated with a "text message" function, while input controls 24 and 26 are associated with electronic mail (email) and phone functions, respectively. A speaker 17 and microphone 19 are provided as well.

In various embodiments, the communication device 10 comprises a portable, battery-operated device and is implemented in the form of a cell phone, personal digital assistant (PDA), PDA phone, Smartphone, etc. The communication device 10 is adapted to enable cell phone calls, any form of text-based communication such as email, Multi-Media Message Service (MMS), Really Simply Syndication (RSS, also referred to as Rich Site Summary and Resource description framework Site Summary) and text messaging. Text messages may be in accordance with the Short Message Service (SMS) standard.

Figure 2:
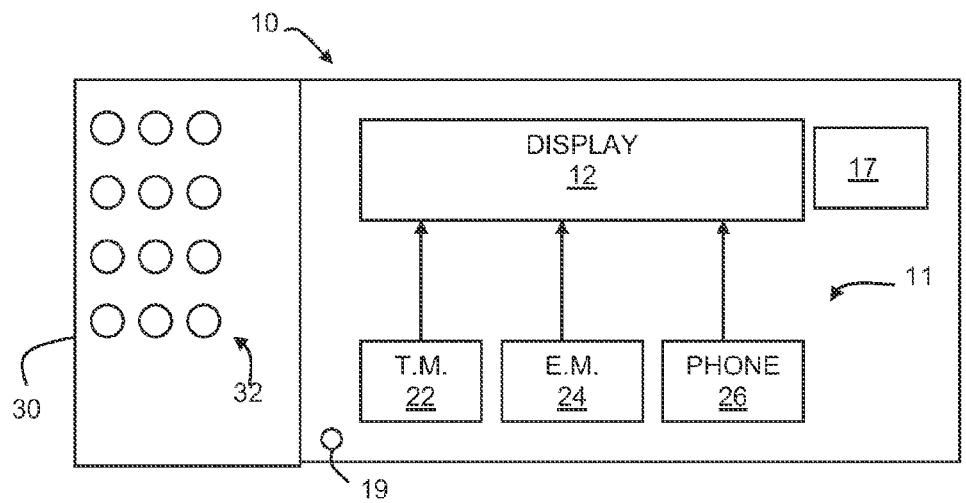
FIG. 2 shows a another view of the communication device of FIG. 1.

In the embodiment of FIG. 1, the display 12, speaker 17, microphone 19, and input controls 22, 24, and 26 are provided on an outer surface of a housing 11 of the communication device 10. In some embodiments, the outer surface of the housing 11 may also comprise a keyboard. In FIG. 2, a slide portion 30 is shown in a deployed position from housing 11. The slide portion 30 slides out from housing 11 to provide the user with access to a keypad 32 as shown in FIG. 2. In the configuration of FIG. 1, a user is able to receive and view text messages and email on display 12. The user is also able to view caller identification information on display 12 upon receipt of an incoming phone call. Further, the user can listen to voice messages via speaker 17 and answer incoming phone calls using speaker 17 and microphone 19. Further, in the configuration of FIG. 1 the user may also record a voice note to be attached to an outgoing message to be sent to a target recipient. In the configuration of FIG. 2, the user uses keypad 32 to dial phone numbers to make phone calls and can receive incoming phone calls.

Figure 3:
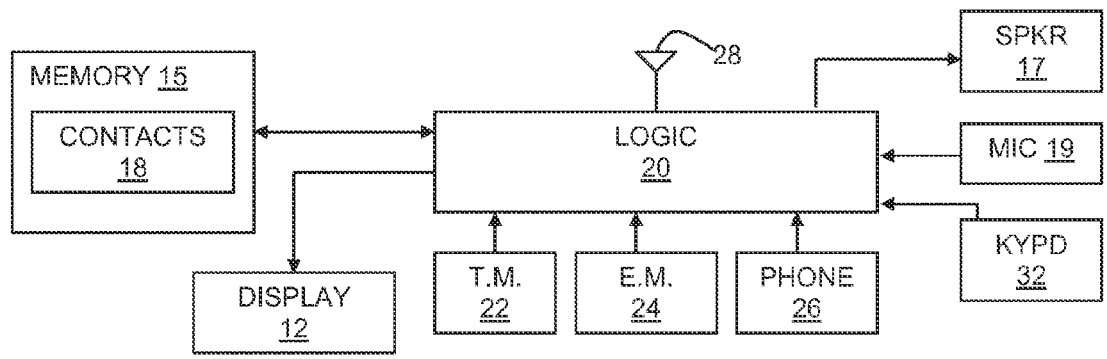
FIG. 3 shows an illustrative block diagram of the communication device of FIG. 1.

FIG. 3 shows a block diagram of the communication device 10. As shown, the communication device 10 comprises logic 20 which couples to display 12, memory 15, speaker 17, microphone 19, input controls 22, 24, and 26 and keypad 32. An antenna 28 is also shown coupled to logic 20 by which wireless communications are received into and transmitted from the communication device 10. One or more "contacts" 18 are stored in memory 15. Each contact 18, for example, comprises a name and phone number, as well as other desired contact information such as mailing address, email address, etc. for a give person or organization. The contact information 18 may be input into the communication device 10 via keypad 32 or may be provided by an external computer to the communication device 10 via any of known synchronization techniques.

Referring to FIGS. 1-3, the communication device 10 receives any of multiple types of communications. A communication type refers to a format of the information provided, the type of information (voice, text, etc.), and/or the protocol by which the information is provided. In accordance with various embodiments, examples of communication types receivable by communication 10 comprise email, text messages, phone calls, voice notes, etc.

In various embodiments, a user of the communication device 10 can cause the communication device to reply to an incoming communication of one type with a communication of a different type. For example, if the communication device 10 receives a text message, the user can activate the email input control 24 to cause the communication device 10 to reply to the incoming text message with an email. Alternatively, the user can activate the phone input control 26 to cause the communication device 10 to reply to the incoming text message with a return phone call. Similarly, a user can activate the text message input control 22 or phone input control 26 to reply to an incoming email with either a text message or phone call, respectively. By way of an additional example, upon receiving and failing to answer an incoming phone call or receiving a voice message, the user can activate either the text message or email input control 22, 24 to reply to the missed phone call or stored voice message with either a text message or email, respectively.

Figure 4:
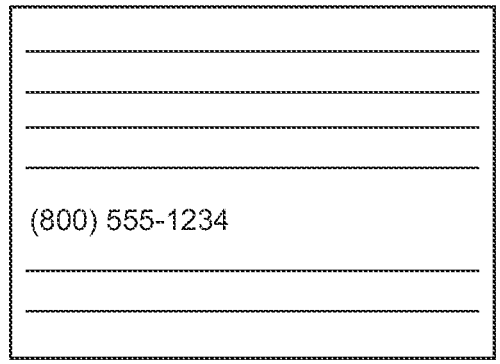
FIG. 4 shows an exemplary display in accordance with various embodiments.

By way of an example of the communication device 10 replying to an incoming email with a phone call, FIG. 4 illustrates the text of an email. In many email messages, the sender of the email either types in his or her return phone number or has a signature block automatically added to the email message upon the message's generation, the signature block recording the phone number. At any rate, a phone number (800-555-1234) of the sender of the email is shown in FIG. 4. Upon the user activating the phone input control 26 (FIG. 1) the logic 20 of the communication device 10 automatically examines the email message for a phone number. In accordance with various embodiments, the logic 20 examines the email for a string of, for example, ten numbers, the first three of which may be encapsulated in parentheses as shown in the example of FIG. 4. The prefix may be separated from the last four numbers of the phone number by a dash, a period, or a space and the logic 20 may take these considerations into account when examining the email for a phone number. The email message may or may not actually include a phone number. However, if the email message does include a phone number and the logic 20 detects the phone number, the logic 20 will automatically initiate a reply phone call to that particular phone number. To the extent that more than one phone number is included in the email message, the logic 20 initiates a phone call to, for example, the first phone number encountered in the email message. In some embodiments, the logic 20 begins analyzing the email from the beginning of the typed email message for a phone number. In other embodiments, the logic 20 begins examining the email message from the end of the email message going backwards to the beginning in attempt to find a phone number.

In other embodiments, upon activating the phone input control 26, the logic 20 compares the sender's name associated with the email message to the contacts 18 stored in memory 15. Upon encountering a match of the sender's name of the email to a name in contacts 18, the logic 20 automatically initiates a phone call to the phone number provided in that particular contact. To the extent more than one phone number is provided in the matching contact, the logic 20 may display the phone numbers to the user of the communication device 10 and the user may select the phone number he or she desires. In other embodiments, the communication device 10 may be pre-programmed at the factory or programmed by the user to give priority to various types of phone numbers. For example, a business number, if present, in the contact is dialed, and if no business number is present, then a mobile phone number if present) is dialed, and so on.

In some embodiments, the logic 20 first examines the email message for a phone number and upon failure to find a phone in the email message, the logic 20 then examines the contacts 18 for a matching name. In alternative embodiments, the logic 20 first examines contacts 18 for a matching name and, failing to find a matching name, then searches the text of the email for a phone number. In yet other embodiments, the logic 20 only examines the contacts 18 for a matching name or only examines the text of the email message for a phone number.

The example described above with respect to the email of FIG. 4 also applies to the reception of a text message. That is, logic 20 can automatically initiate a phone call upon receipt of a text message upon the logic 20 detecting a phone number embedded within the text message or finding a name in contacts 18 that matches the sender of the text message.

The user of the communication device 10 can also cause the communication device 10 to reply to a text message with an email, or to an email with a text message, or to an email or text message with a voice-recorded attachment. For example, upon receipt of a email, that email may comprise a phone number which can be detected by logic 20 as described above and used by the logic 20 to initiate a reply text message (which uses a phone number as the sender's identity). Alternatively, the logic 20 compares the name of the sender of the email to contacts 18 to find a matching name and then uses the phone number in that matching contact name to initiate the text message. Further still, the logic 20 may first examine the email for a phone number and, upon failing to find a phone number, automatically examine contacts 18 for a matching name to find a suitable phone number. Further still, logic 20 may first examine contacts 18 for a matching name and hence a corresponding phone number, and failing to find a matching name, examine the contents of the email for a phone number.

A similar process may apply to the reception of a text message. That is, the logic 20 may examine contacts 18 for a name that corresponds to the sender of a text message. Upon finding such a matching name, the logic 20 then initiates an email reply to that particular person. If a matching name is not found in contacts 18, the logic 20 may then examine the body of the text message for an email address to be used to formulate a reply email.

Upon receipt of a text message, the communication device 10 can either use the name of the sender of the text message or the phone number associated with the text message as a search mechanism into contacts 18. That is, if the communication device 10 (e.g., logic 20) is examining contacts 18 for an email address for a reply email message to a incoming text message, the logic 20 may examine contacts 18 based on either the name of the sender of the text message or the phone number of the sender of the text message. Similarly, upon receipt of an incoming email, the logic 20 may examine contacts 18 for a phone number for a reply text message or phone call based on either the name of the sender of the email or the sender's email address itself.

Figure 5:
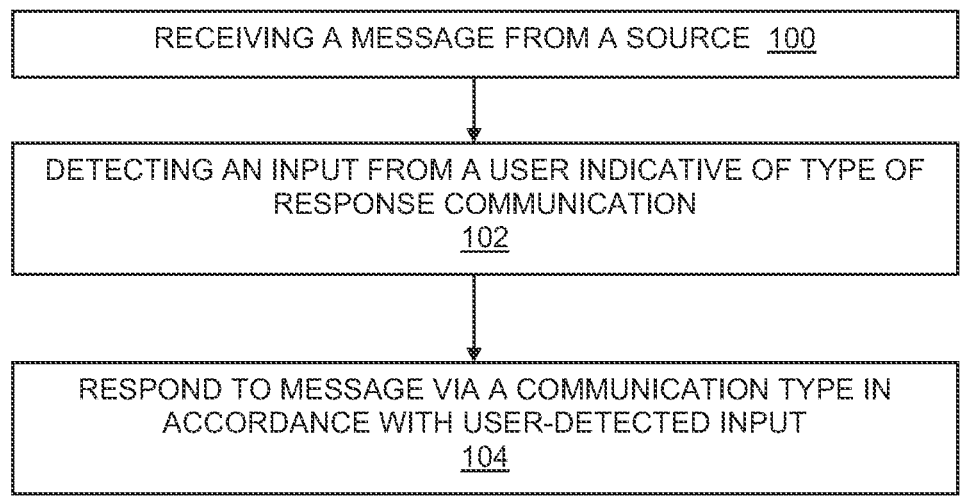
FIG. 5 shows a method in accordance with various embodiments.

FIG. 5 shows a method in accordance with various embodiments. At 100, the method comprises receiving a message from a source. The message referred to at 100 comprises any of multiple communication types (e.g., phone calls, emails, text messages, etc.). At 102, the method of FIG. 5 comprises detecting an input from a user indicative of a type of response communication desired by the user. The detection at 102 refers to the logic 20 detecting which of the input controls 22, 24, and 26 the user has activated for the communication device 10 to automatically initiate a reply message. At 104, the method further comprises responding to the incoming message via a communication type in accordance with the user-detected input. That is, the communication device responds to the incoming message of a first type with a reply message in accordance with the communication type selected by the user via input controls 22, 24, and 26.

In another example, a user of the communication device 10 can reply to an incoming message of a particular type (e.g., text message, email, missed phone call/voice message) with a voice note. A voice note comprises an audio recording via microphone 19 by the user to the incoming message. The recorded voice note is then sent back to the recipient. A separate voice note input control can be provided to initiate and record voice notes.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving, by a communication device, a communication from a source in a first communication type;
   receiving, by the communication device, an input from a user of the communication device, the input being indicative of a type of response selected from a plurality of response types;
   if contact information associated with the source is found in the communication from the source, examining, by the communication device, the communication for the contact information associated with the source, the contact information corresponding to the type of response selected by the user;
   if the contact information corresponding to the type of response selected by the user is not found in the communication from the source, preparing a response using contact information otherwise associated with the source and corresponding to the type of response selected by the user; and
   sending, by the communication device, a response to the contact information otherwise associated with the source, the response being of the type of response selected by the user.

2. The method of claim 1, wherein the plurality of response types includes at least one of electronic mail, text message, voice message, phone call or voice note.

3. The method of claim 1, wherein the type of response selected by the user is electronic mail and the contact information corresponding to the type of response selected by the user is an email address.

4. The method of claim 1, wherein the type of response selected by the user is phone call and the contact information corresponding to the type of response selected by the user is a telephone number.

5. The method of claim 1, wherein the type of response selected by the user is text message and the contact information corresponding to the type of response selected by the user is a telephone number.

6. The method of claim 1, wherein the type of response selected by the user is different from the first communication type.

7. The method of claim 1, wherein preparing the response using contact information otherwise associated with the source includes:
   searching, by the communication device, through a plurality of contacts for a contact associated with the source.

8. A method, comprising:
   receiving a message from a source;
   after receiving the message, detecting an input from a user, said input being indicative of a type of response communication selected from a plurality of response communication types provided to the user for said received message, said response communications including at least one of electronic mail, text message, voice message, phone call, and voice note; and
   responding to the message via a communication type in accordance with the user detected input,
   wherein, upon the user selecting phone call as the communication type, responding to the message comprises:
      when a phone number is found in the communication, examining the communication for a phone number; and
      when a phone number is not found in the communication, initiating the phone call to a phone number otherwise associated with the source.

9. The method of claim 8, wherein responding to the message comprises responding via a communication type that differs from the communication type of the message.

10. The method of claim 8, wherein receiving the message comprises receiving a text message and wherein responding to the message comprises responding via a phone call.

11. The method of claim 8, further comprising examining a plurality contacts for a contact corresponding to the source of the message.

12. A communication device, comprising:
   a logic; and
   a memory coupled to the logic, the memory storing instructions which, when executed by the logic, cause the logic to:
      receive a communication from a source in a first communication type;
      receive an input from a user of the communication device, the input being indicative of a type of response selected from a plurality of response types;
      if contact information associated with the source is found in the communication from the source, examine the communication for the contact information associated with the source, the contact information corresponding to the type of response selected by the user;
      if the contact information corresponding to the type of response selected by the user is not found in the communication from the source, prepare a response using contact information otherwise associated with the source and corresponding to the type of response selected by the user; and
      send a response to the contact information otherwise associated source, the response being of the type of response selected by the user.

13. The communication device of claim 12, wherein the plurality of response types includes at least one of electronic mail, text message, voice message, phone call or voice note.

14. The communication device of claim 12, wherein the type of response selected by the user is electronic mail and the contact information corresponding to the type of response selected by the user is an email address.

15. The communication device of claim 12, wherein the type of response selected by the user is phone call and the contact information corresponding to the type of response selected by the user is a telephone number.

16. The communication device of claim 12, wherein the type of response selected by the user is text message and the contact information corresponding to the type of response selected by the user is a telephone number.

17. The communication device of claim 12, wherein the type of response selected by the user is different from the first communication type.

18. The communication device of claim 12, wherein preparing the response using contact information otherwise associated with the source includes:
   searching, by the communication device, through a plurality of contacts for a contact associated with the source.

* * * * *